US012717827B2

(12) United States Patent
Cheng et al.

(10) Patent No.: US 12,717,827 B2
(45) Date of Patent: Aug. 25, 2026

(54) LARGE LANGUAGE MODELS IN CLOUD DATABASE PLATFORMS

(71) Applicant: Google LLC, Mountain View, CA (US)

(72) Inventors: Xi Cheng, Kirkland, WA (US); Amir Hossein Hormati, Seattle, WA (US); Bo Yang, Kirkland, WA (US); Mingge Deng, Kirkland, WA (US); Qiang Hao, Seattle, WA (US)

(73) Assignee: Google LLC, Mountain View, CA (US)

( * ) Notice: Subject to any disclaimer, the term of this patent is extended or adjusted under 35 U.S.C. 154(b) by 111 days.

(21) Appl. No.: 18/736,618

(22) Filed: Jun. 7, 2024

(65) Prior Publication Data

US 2025/0036670 A1 Jan. 30, 2025

Related U.S. Application Data

(60) Provisional application No. 63/529,169, filed on Jul. 27, 2023.

(51) Int. Cl.
*G06F 16/33* (2025.01)
*G06F 16/334* (2025.01)

(52) U.S. Cl.
CPC ................................ *G06F 16/3344* (2019.01)

(58) Field of Classification Search
CPC .................................................. G06F 16/3344
USPC .......................................................... 707/769
See application file for complete search history.

(56) References Cited

U.S. PATENT DOCUMENTS

| | | | | |
|---|---|---|---|---|
| 7,668,800 | B2 * | 2/2010 | Motoyama | G06Q 10/06 707/718 |
| 11,790,224 | B2 * | 10/2023 | Modi | G06N 3/045 706/20 |
| 11,931,894 | B1 * | 3/2024 | Rose | B25J 19/02 |
| 12,032,919 | B1 * | 7/2024 | Szwabe | G06F 40/284 |
| 2020/0004824 | A1 * | 1/2020 | Willcock | G06F 16/243 |
| 2020/0151272 | A1 * | 5/2020 | Freitag | G06F 16/2455 |
| 2020/0349180 | A1 * | 11/2020 | Kempf | G06N 3/08 |
| 2021/0055918 | A1 * | 2/2021 | Dayanandan | G06F 8/10 |
| 2021/0303742 | A1 * | 9/2021 | Singh | G06N 3/126 |
| 2022/0383150 | A1 * | 12/2022 | Le | G06N 20/00 |

(Continued)

OTHER PUBLICATIONS

Generate text by using a remote model and the ML.GENERATE_TEXT function. Jun. 23, 2023. Google Cloud. 11 pages. Retrieved from the Internet: <https://cloud.google.com/bigquery/docs/generate-text-tutorial>.

(Continued)

*Primary Examiner* — Hanh B Thai
(74) *Attorney, Agent, or Firm* — Lerner David LLP

(57) ABSTRACT

Aspects of the disclosure are directed to integrating one or more large language models (LLMs) into a cloud database platform, such as a data warehouse. Users of the cloud database platform can provide queries to instruct one or more LLMs to perform generative natural language processing tasks by manipulating or generating text directly in the cloud database platform with a table valued function. Users can provide input to register or generate one or more LLMs of the cloud database platform for performing the natural language processing tasks. Integrating LLMs into the cloud database platform can improve processing capabilities of the LLMs and save computing resources, as specialized LLMs or application-specific API may no longer be necessary.

16 Claims, 5 Drawing Sheets

(56) References Cited

U.S. PATENT DOCUMENTS

| | | | | |
|---|---|---|---|---|
| 2023/0079074 | A1* | 3/2023 | Cella | G06F 16/24552<br>707/769 |
| 2023/0082446 | A1* | 3/2023 | Zilio | G06F 16/24561<br>707/769 |
| 2023/0351184 | A1* | 11/2023 | Di Fabbrizio | G06F 18/2155 |
| 2024/0095463 | A1* | 3/2024 | Leary | G06F 40/20 |
| 2024/0160851 | A1* | 5/2024 | Medapati | G06F 16/951 |
| 2024/0289356 | A1* | 8/2024 | Fox | G06F 16/287 |
| 2024/0303423 | A1* | 9/2024 | Fabian | G06F 40/18 |
| 2024/0303424 | A1* | 9/2024 | Reddy | G06F 40/40 |
| 2024/0303440 | A1* | 9/2024 | Fabian | G06F 40/18 |
| 2024/0303441 | A1* | 9/2024 | Sobhy Deraz | G06F 40/18 |
| 2024/0346021 | A1* | 10/2024 | Xuan | G06F 40/20 |
| 2024/0362468 | A1* | 10/2024 | Lee | G06N 3/047 |
| 2024/0370764 | A1* | 11/2024 | Goyal | G06N 20/00 |
| 2024/0378198 | A1* | 11/2024 | Latendresse | G06F 16/2425 |
| 2024/0386060 | A1* | 11/2024 | Lisuk | G06F 16/90344 |
| 2024/0403341 | A1* | 12/2024 | Berglund | G06F 16/3326 |
| 2024/0412000 | A1* | 12/2024 | Mui | G06F 16/953 |
| 2024/0412004 | A1* | 12/2024 | Manikandan | G06F 40/30 |

OTHER PUBLICATIONS

Generate text by using the ML.GENERATE_TEXT function. Jun. 23, 2023. Google Cloud. 6 pages. Retrieved from the Internet: <https://cloud.google.com/bigquery/docs/generate-text>.

Grabs. Building a Data-Centric Platform for Generative AI and LLMs at Snowflake. Apr. 20, 2023. 4 pages. Retrieved from the Internet: <https://www.snowflake.com/blog/building-data-centric-platform-ai-llm/>.

Kaushikk. Unlocking the Potential of AI: How Databricks Dolly is Democratizing LLMs. May 10, 2023. 18 pages. Retrieved from the Internet: <https://rajanieshkaushikk.com/2023/05/10/unlocking-the-potential-of-ai-how-databricks-dolly-is-democratizing-llms/#how-databricks-can-address-these-challenges>.

Responsible AI. Jun. 23, 2023. Google Cloud. 9 pages. Retrieved from the Internet: <https://cloud.google.com/vertex-ai/docs/generative-ai/learn/responsible-ai#vertex_palm_api>.

Securely deploy LLMs inside VPCs with Hugging Face and Amazon SageMaker. Jun. 19, 2023. Philschmid. 9 pages. Retrieved from the Internet: <https://www.philschmid.de/sagemaker-llm-vpc>.

* cited by examiner

400

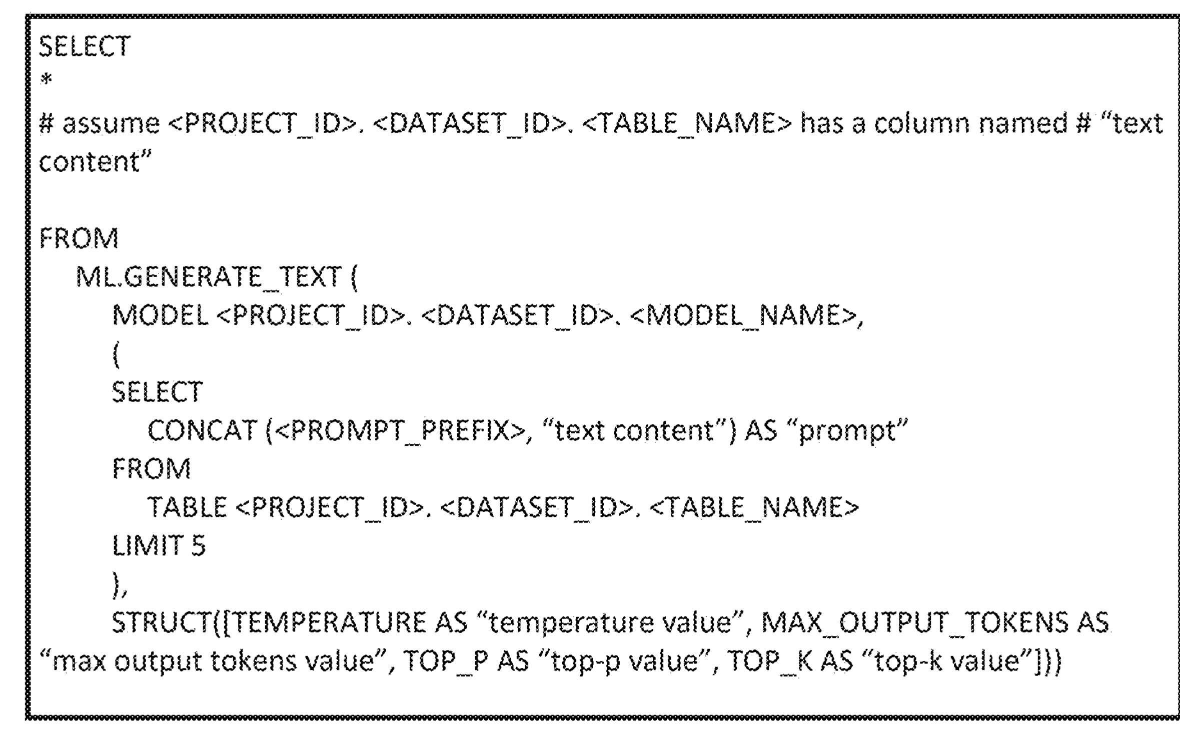

```
SELECT
*
# assume <PROJECT_ID>. <DATASET_ID>. <TABLE_NAME> has a column named # "text
content"

FROM
    ML.GENERATE_TEXT (
        MODEL <PROJECT_ID>. <DATASET_ID>. <MODEL_NAME>,
        (
        SELECT
            CONCAT (<PROMPT_PREFIX>, "text content") AS "prompt"
        FROM
            TABLE <PROJECT_ID>. <DATASET_ID>. <TABLE_NAME>
        LIMIT 5
        ),
        STRUCT([TEMPERATURE AS "temperature value", MAX_OUTPUT_TOKENS AS
"max output tokens value", TOP_P AS "top-p value", TOP_K AS "top-k value"]))
```

FIG. 4

LARGE LANGUAGE MODELS IN CLOUD DATABASE PLATFORMS

CROSS-REFERENCE TO RELATED APPLICATIONS

The present application claims the benefit of the filing date of U.S. Provisional Patent Application No. 63/529,169, filed Jul. 27, 2023, the disclosure of which is hereby incorporated herein by reference.

BACKGROUND

Large language models (LLMs) continue to grow in popularity and expand in use for a myriad of applications. Despite advances in the LLMs, there is no ability to integrate LLM functionality into cloud database platforms. Performing a natural language processing task using a LLM based on data in a cloud database platform may involve generating LLM-specific application programming interfaces (APIs) or using a specialized LLM. However, both of these options can be difficult to utilize as well as result in increased processing cost and memory usage.

BRIEF SUMMARY

Aspects of the disclosure are directed to integrating one or more large language models (LLMs) into a cloud database platform, such as a data warehouse, data lake, or data lakehouse. Users of the cloud database platform can provide queries to instruct one or more LLMs to perform generative natural language processing tasks by manipulating or generating text directly in the cloud database platform with a table valued function. Users can provide input to register or generate one or more LLMs of the cloud database platform for performing the natural language processing tasks. Integrating LLMs into the cloud database platform can improve processing capabilities of the LLMs and save computing resources, as specialized LLMs or application-specific API may no longer be necessary.

An aspect of the disclosure provides for a method for performing a natural language processing task in a cloud database platform, the method including: receiving, by one or more processors, a query to perform the natural language processing task, the query including a table valued function configured to generate text for instructing a machine learning model to perform the natural language processing task based on tabular data stored in the cloud database platform; generating, by the one or more processors, the text for instructing the machine learning model to perform the natural language processing task using the table valued function; performing, by the one or more processors, the natural language processing task using the text and the tabular data stored in the cloud database platform; and outputting, by the one or more processors, tabular results for the natural language processing task as a response to the query.

Another aspect of the disclosure provides for a system including: one or more processors; and one or more storage devices coupled to the one or more processors and storing instructions that, when executed by the one or more processors, cause the one or more processors to perform operations for the method for performing a natural language processing task in a cloud database platform. Yet another aspect of the disclosure provides for a non-transitory computer readable medium for storing instructions that, when executed by one or more processors, cause the one or more processors to perform operations for the method for performing a natural language processing task in a cloud database platform.

In an example, the method further includes registering, by the one or more processors, the machine learning model with a user of the cloud database platform. In another example, registering the machine learning model further includes generating the machine learning model.

In yet another example, the machine learning model is a large language model. In yet another example, the natural language processing task includes at least one of sentiment analysis, named entity recognition, text translation, text summarization, or text classification.

In yet another example, the table valued function includes one or more references to one or more datasets of the tabular data stored in the cloud database platform and generating the text for instructing the machine learning model to perform the natural language processing task further includes determining which datasets of the tabular data to use when performing the natural language processing task based on the references to the datasets in the table valued function. In yet another example, the table valued function includes one or more references to the machine learning model; and generating the text for instructing the machine learning model to perform the natural language processing task further includes determining which machine learning model to use when performing the natural language processing task based on the references to the machine learning model in the table valued function. In yet another example, the table valued function includes a prompt prefix corresponding to the natural language processing task and the tabular data stored in the cloud database platform on which the natural language processing task is performed and generating the text for instructing the machine learning model to perform the natural language processing task further includes determining which natural language processing task to perform and which tabular data to use based on the prompt prefix in the table valued function.

In yet another example, the table valued function includes one or more parameters affecting performance of the machine learning model and generating the text for instructing the machine learning model to perform the natural language processing task further includes determining which parameters to use based on the parameters in the table valued function. In yet another example, the one or more parameters include at least one of temperature, maximum output tokens, top-k, or top-p.

BRIEF DESCRIPTION OF THE DRAWINGS

FIG. 4 depicts a block diagram of an example table valued function for generating text for one or more machine learning models to perform natural language processing tasks according to aspects of the disclosure.

DETAILED DESCRIPTION

Large language models (LLMs) are giant neural networks that receive text prompts and output text results for natural language processing and deep learning. LLMs can be tuned for one or more specific tasks using prompt based model tuning. Prompt based model tuning can include prompt design. Prompt design can include providing the LLM with additional text, such as context, input, and/or examples, before, after, or when providing a prompt. Example prompt designs can include zero-shot, one-shot, or few-shot prompts.

In a cloud database platform, such as a data warehouse, a LLM service can be exposed through one or more endpoints or application programming interfaces (APIs). Users of the cloud database platform can generate a connection to the cloud database platform for generating a remote model for each user. The user can run model batch inference by inputting a prompt directly in a table valued function for generating text for the remote model. The user can also select and/or modify a prompt stored in the cloud database platform, such as selecting the prompt and applying a string scalar function like concatenate. The prompt and all associated parameters can be applied to rows of an input text table. Different prompts for the table valued function can be associated with particular natural language processing tasks, such as generating text embeddings or moderating text.

Figure 1:
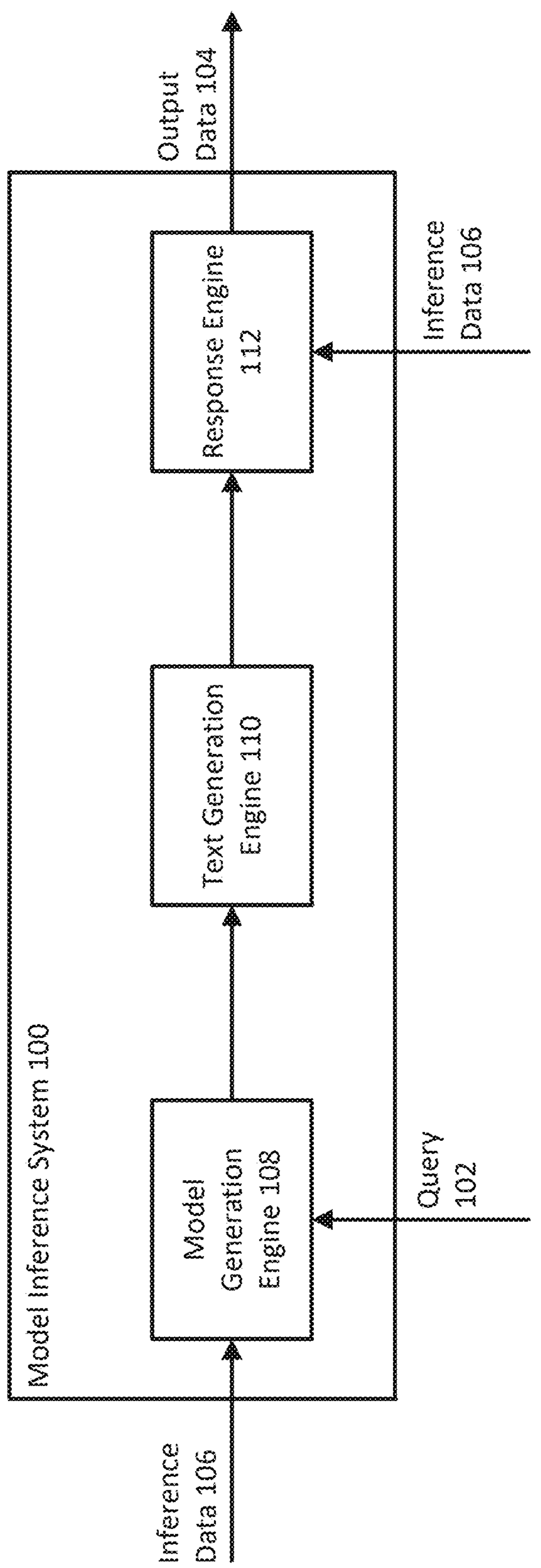
FIG. 1 depicts a block diagram of an example model inference system according to aspects of the disclosure.

FIG. 1 depicts a block diagram of an example model inference system 100 for allowing a machine learning model, such as a LLM, to perform generative natural language processing tasks on tabular data in response to received queries. The model inference system 100 can be implemented on one or more computing devices in one or more locations. The model inference system 100 may be part of a remote system in communication with one or more user devices via a network. The remote system may be a single computer, multiple computers, or a distributed system like a cloud environment. The remote system may include computing resources, such as data processing hardware, and storage resources, such as memory hardware. A data store, such as a remote storage device, may be overlain on the storage resources to allow scalable use of the storage resources by one or more of the clients, such as the user devices, or the computing resources. The data store can be configured to store a plurality of data blocks within one or more tables, such as a cloud database, that each include a plurality of rows and columns. The data store may store any number of tables.

The model inference system 100 can be configured to receive a query 102 associated with a task, such as from a user device via the network. The task can be a natural language processing task, a question-answering task, a content extraction task, and/or an idea generation task, as examples. Example natural language processing tasks can include sentiment analysis, named entity recognition, translation, summarization, and/or classification. The user device may correspond to any computing device, such as a desktop workstation, a laptop workstation, or a mobile device, such as a smartphone. The user device can include computing resources and storage resources. Each query 102 can request one or more tasks for the model inference system 100 to generate output data 104 associated with one or more results for the tasks based on inference data 106 on which to perform the tasks. The model inference system 100 can return the output data 104, such as to the user device via the network as a query response.

The query 102 may be natural language or standard query language (SQL). The query 102 can include a table valued function with a reference to generate text for a prompt associated with one or more columns of a table stored in the data store. The one or more columns can include identifiers for projects, datasets, models, prompts, and/or the data itself. The model inference system 100 can use the table valued function to allow the one or more models to perform various natural language processing tasks.

The model inference system 100 can include a model generation engine 108, a text generation engine 110, and a response engine 112. The model generation engine 108, text generation engine 110, and/or response engine 112 can be implemented as one or more computer programs, specially configured electronic circuitry, and any combination thereof.

The model generation engine 108 can be configured to generate one or more models, such as LLMs, for performing various natural language processing tasks in response to the queries 102. As part of or in addition to the queries 102, the model generation engine 108 can receive a request to register one or more models. The request to register can associate one or more virtual models with a user of the user device. The one or more models can be pre-trained on the inference data 106, such as on data blocks retrieved from one or more tables stored on the data store associated with one or more queries 102.

The text generation engine 110 can be configured to receive the table valued function as part of the query 102 and generate text to allow the one or more models to perform various natural language processing tasks. For example, the table valued function can include instructions to generate text based on a prompt prefix and text content. The prompt prefix can include instructions for various natural language processing tasks to be performed on the text content. The table valued function can also include a reference to identifiers for projects, datasets, models, and/or tables to be used in the natural language processing tasks. The text generation engine 110 can use the inputs in the table valued function to generate text that includes a natural language process task to perform on text content stored as tabular data.

The response engine 112 can be configured to receive the text from the text generation engine 110 and perform one or more tasks, such as natural language processing tasks, using the one or more models generated by the model generation engine 108. Results of the tasks can be output as output data 104 and can be based on one or more tables of the inference data 106. The response engine 112 can return the output data 104 to the user device, which can display the output data 104, such as via a table. Numerous results for each row of a table can be displayed based on the tabular data of the inference data 106 used in performing the tasks.

The response engine 108 can be configured to perform the tasks based on different parameters. Example parameters can include temperature, maximum output tokens, top-k, and/or top-p. Temperature can refer to a degree of randomness in token selection, where lower temperatures are used for prompts that expect a true response while higher temperatures are used for prompts that expect a more diverse response. Maximum output tokens can refer to a maximum number of tokens generated in a response, where lower values are used for shorter responses and higher values are used for longer responses. Top-k and top-p can refer to how the model selects tokens for output. For each token selection step, the top-k tokens with the highest probabilities are sampled and then the tokens are further filtered based on top-p with a final token selected using the temperature sampling. Lower values of top-k and top-p can lead to less random responses and higher values can lead to more random responses.

Figure 2:
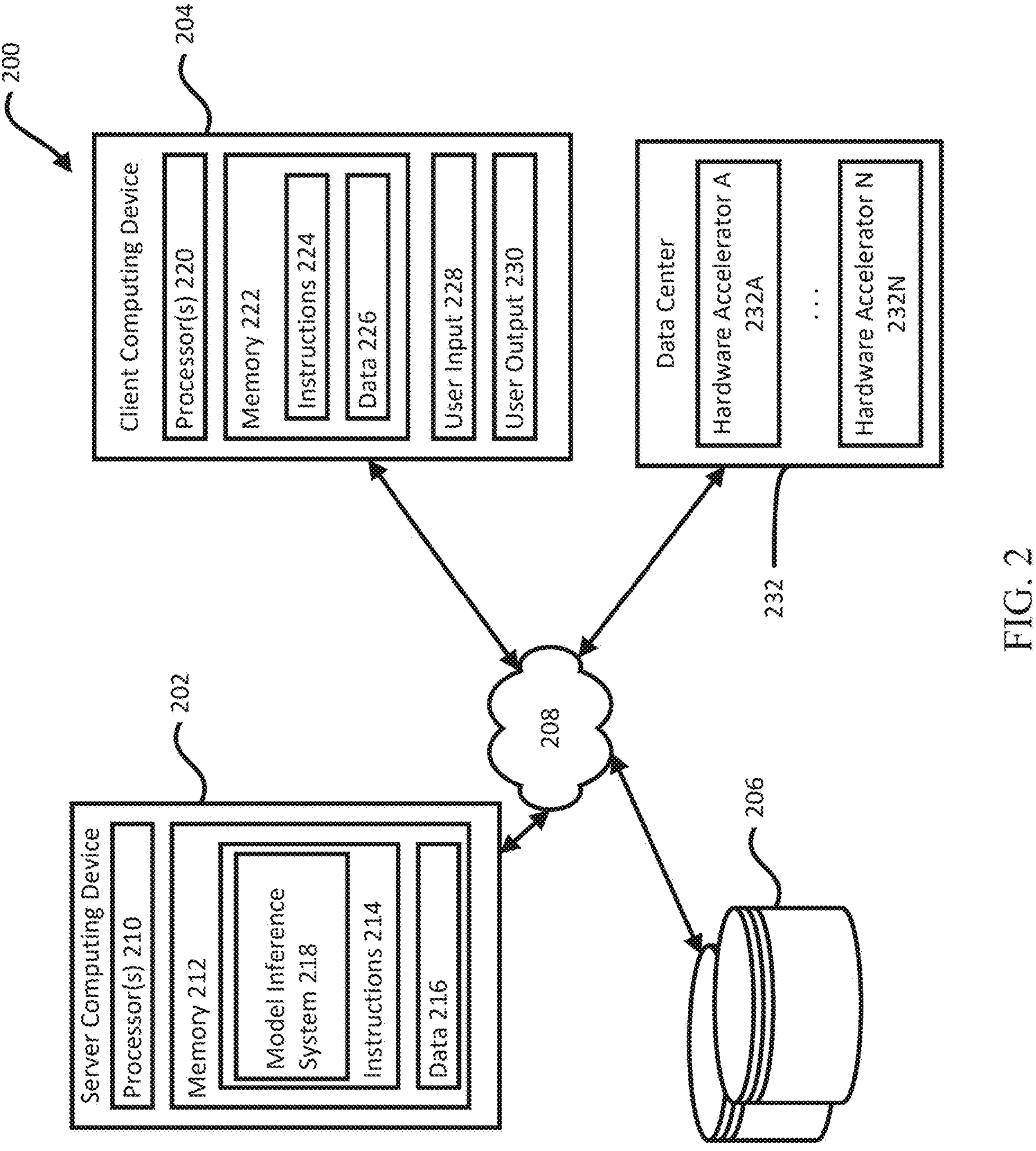
FIG. 2 depicts a block diagram of an example environment for implementing a model inference system according to aspects of the disclosure.

FIG. 2 depicts a block diagram of an example environment 200 for implementing a model inference system 218. The model inference system 218 can be implemented on one or more devices having one or more processors in one or more locations, such as in server computing device 202. Client computing device 204 and the server computing device 202 can be communicatively coupled to one or more storage devices 206 over a network 208. The storage devices 206 can be a combination of volatile and non-volatile memory and can be at the same or different physical locations than the computing devices 202, 204. For example, the storage devices 206 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 202 can include one or more processors 210 and memory 212. The memory 212 can store information accessible by the processors 210, including instructions 214 that can be executed by the processors 210. The memory 212 can also include data 216 that can be retrieved, manipulated, or stored by the processors 210. The memory 212 can be a type of non-transitory computer readable medium capable of storing information accessible by the processors 210, such as volatile and non-volatile memory. The processors 210 can include one or more central processing units (CPUs), graphic processing units (GPUs), field-programmable gate arrays (FPGAs), and/or application-specific integrated circuits (ASICs), such as tensor processing units (TPUs).

The instructions 214 can include one or more instructions that, when executed by the processors 210, cause the one or more processors to perform actions defined by the instructions 214. The instructions 214 can be stored in object code format for direct processing by the processors 210, or in other formats including interpretable scripts or collections of independent source code modules that are interpreted on demand or compiled in advance. The instructions 214 can include instructions for implementing a model inference system 218, which can correspond to the model inference system 100 of FIG. 1. The model inference system 218 can be executed using the processors 210, and/or using other processors remotely located from the server computing device 202.

The data 216 can be retrieved, stored, or modified by the processors 210 in accordance with the instructions 214. The data 216 can be stored in computer registers, in a relational or non-relational database as a table having a plurality of different fields and records, or as JSON, YAML, proto, or XML documents. The data 216 can also be formatted in a computer-readable format such as, but not limited to, binary values, ASCII, or Unicode. Moreover, the data 216 can include information sufficient to identify relevant information, such as numbers, descriptive text, proprietary codes, pointers, references to data stored in other memories, including other network locations, or information that is used by a function to calculate relevant data.

The client computing device 204 can also be configured similarly to the server computing device 202, with one or more processors 220, memory 222, instructions 224, and data 226. The client computing device 204 can also include a user input 228 and a user output 230. The user input 228 can include any appropriate mechanism or technique for receiving input from a user, such as keyboard, mouse, mechanical actuators, soft actuators, touchscreens, microphones, and sensors.

The server computing device 202 can be configured to transmit data to the client computing device 204, and the client computing device 204 can be configured to display at least a portion of the received data on a display implemented as part of the user output 230. The user output 230 can also be used for displaying an interface between the client computing device 204 and the server computing device 202. The user output 230 can alternatively or additionally include one or more speakers, transducers or other audio outputs, a haptic interface or other tactile feedback that provides non-visual and non-audible information to the platform user of the client computing device 204.

Although FIG. 2 illustrates the processors 210, 220 and the memories 212, 222 as being within the computing devices 202, 204, components described herein can include multiple processors and memories that can operate in different physical locations and not within the same computing device. For example, some of the instructions 214, 224 and the data 216, 226 can be stored on a removable SD card and others within a read-only computer chip. Some or all of the instructions and data can be stored in a location physically remote from, yet still accessible by, the processors 210, 220. Similarly, the processors 210, 220 can include a collection of processors that can perform concurrent and/or sequential operation. The computing devices 202, 204 can each include one or more internal clocks providing timing information, which can be used for time measurement for operations and programs run by the computing devices 202, 204.

The server computing device 202 can be connected over the network 208 to a data center 232 housing any number of hardware accelerators 232A-N. The data center 232 can be one of multiple data centers or other facilities in which various types of computing devices, such as hardware accelerators, are located. Computing resources housed in the data center 232 can be specified for deploying models related to various natural language processing tasks as described herein.

The server computing device 202 can be configured to receive requests to process data from the client computing device 204 on computing resources in the data center 232. For example, the environment 200 can be part of a computing platform configured to provide a variety of services to users, through various user interfaces and/or application programming interfaces (APIs) exposing the platform services. The variety of services can include performing natural language processing tasks. The client computing device 204 can transmit input data associated with requests for natural language processing. The model inference system 218 can receive the input data, and in response, generate output data.

As other examples of potential services provided by a platform implementing the environment 200, the server computing device 202 can maintain a variety of models in accordance with different constraints available at the data center 232. For example, the server computing device 202 can maintain different families for deploying models on various types of TPUs and/or GPUs housed in the data center 232 or otherwise available for processing.

Figure 3:
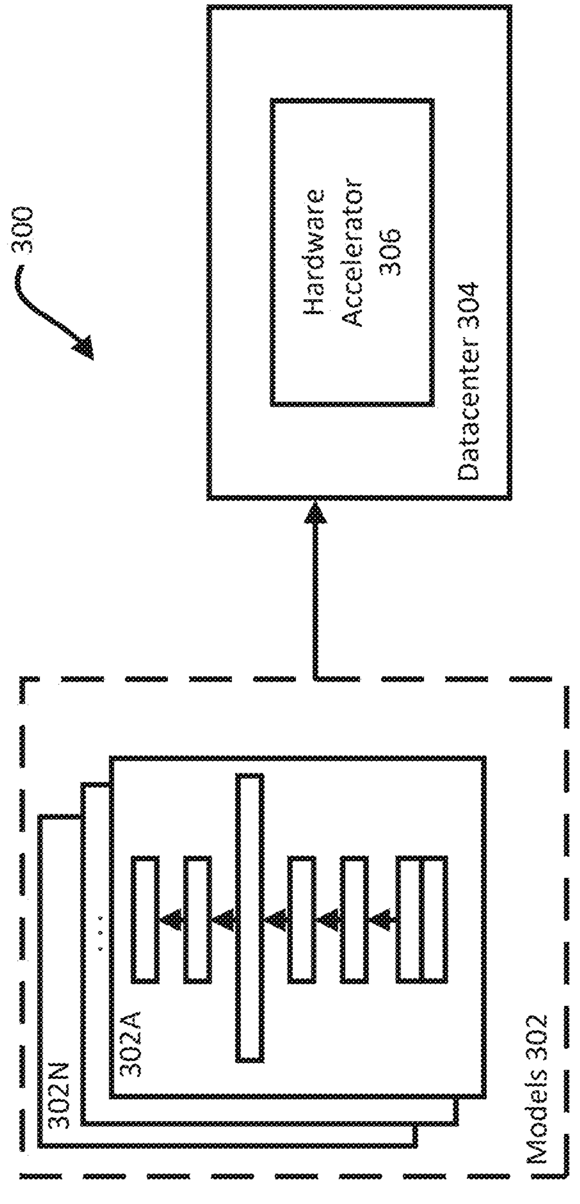
FIG. 3 depicts a block diagram illustrating one or more model architectures according to aspects of the disclosure.

FIG. 3 depicts a block diagram 300 illustrating one or more model architectures 302, more specifically 302A-N for each architecture, for deployment in a datacenter 304 housing a hardware accelerator 306 on which the deployed models 302 will execute, such as for providing natural language processing. The hardware accelerator 306 can be any type of processor, such as a CPU, GPU, FPGA, or ASIC such as a TPU.

An architecture 302 of a model, such as a LLM, can refer to characteristics defining the model, such as characteristics of layers for the LLM, how the layers process input, or how the layers interact with one another. The architecture 302 of the model can also define types of operations performed within each layer. One or more model architectures 302 can be generated that can output results, such as for natural language processing. Example LLM architectures 302 can correspond to pathway language models, such as PaLM-62B, PaLM-540B, or GPT-3.

Referring back to FIG. 2, the devices 202, 204 and the data center 232 can be capable of direct and indirect communication over the network 208. For example, using a network socket, the client computing device 204 can connect to a service operating in the data center 232 through an Internet protocol. The devices 202, 204 can set up listening sockets that may accept an initiating connection for sending and receiving information. The network 208 itself can include various configurations and protocols including the Internet, World Wide Web, intranets, virtual private networks, wide area networks, local networks, and private networks using communication protocols proprietary to one or more companies. The network 208 can support a variety of short- and long-range connections. The short- and long-range connections may be made over different bandwidths, such as 2.402 GHZ to 2.480 GHZ, commonly associated with the Bluetooth® standard, 2.4 GHz and 5 GHZ, commonly associated with the Wi-Fi® communication protocol; or with a variety of communication standards, such as the LTE® standard for wireless broadband communication. The network 208, in addition or alternatively, can also support wired connections between the devices 202, 204 and the data center 232, including over various types of Ethernet connection.

Although a single server computing device 202, client computing device 204, and data center 232 are shown in FIG. 2, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device connected to hardware accelerators configured for processing optimization models, and any combination thereof.

FIG. 4 depicts a block diagram of an example table valued function 400 for generating text for the one or more models. The table valued function can be part of a query received by a model inference system, such as the model inference system 100 as depicted in FIG. 1.

The table valued function 400 can include syntax for generating text to instruct a model to perform one or more natural language processing tasks. For example, the syntax can be "ML.GENERATE TEXT ( . . . )". The syntax can include references to one or more projects, datasets, and/or models for performing the natural language processing tasks, such as "PROJECT_ID", "DATASET_ID", and/or "MODEL_NAME", respectively. The syntax can further include concatenating a prompt prefix to text content, where the prompt prefix can correspond to one or more natural language processing tasks to be performed on the text content. Example prompt prefixes can include sentiment analysis, such as "perform sentiment analysis on the following text: . . . ", named entity recognition, such as "extract the named entities from the text and output the named entities only: . . . ", translation, such as "translate the text into Japanese: . . . ", text summarization, such as "summarize the text into one sentence: . . . ", and/or text classification, such as "classify the text into one of the following categories: [positive, negative], and only output one word: . . . ". The syntax can also include references to one or more projects, datasets, and/or tables for providing data to allow the model to perform the natural language processing tasks, such as "PROJECT_ID", "DATASET_ID", and/or "TABLE_NAME", respectively. The syntax can further include one or more parameters affecting length of result and/or randomness of results of the model performing the natural language processing tasks. Example parameters can include temperature, maximum output tokens, top-k, and/or top-p.

Figure 5:
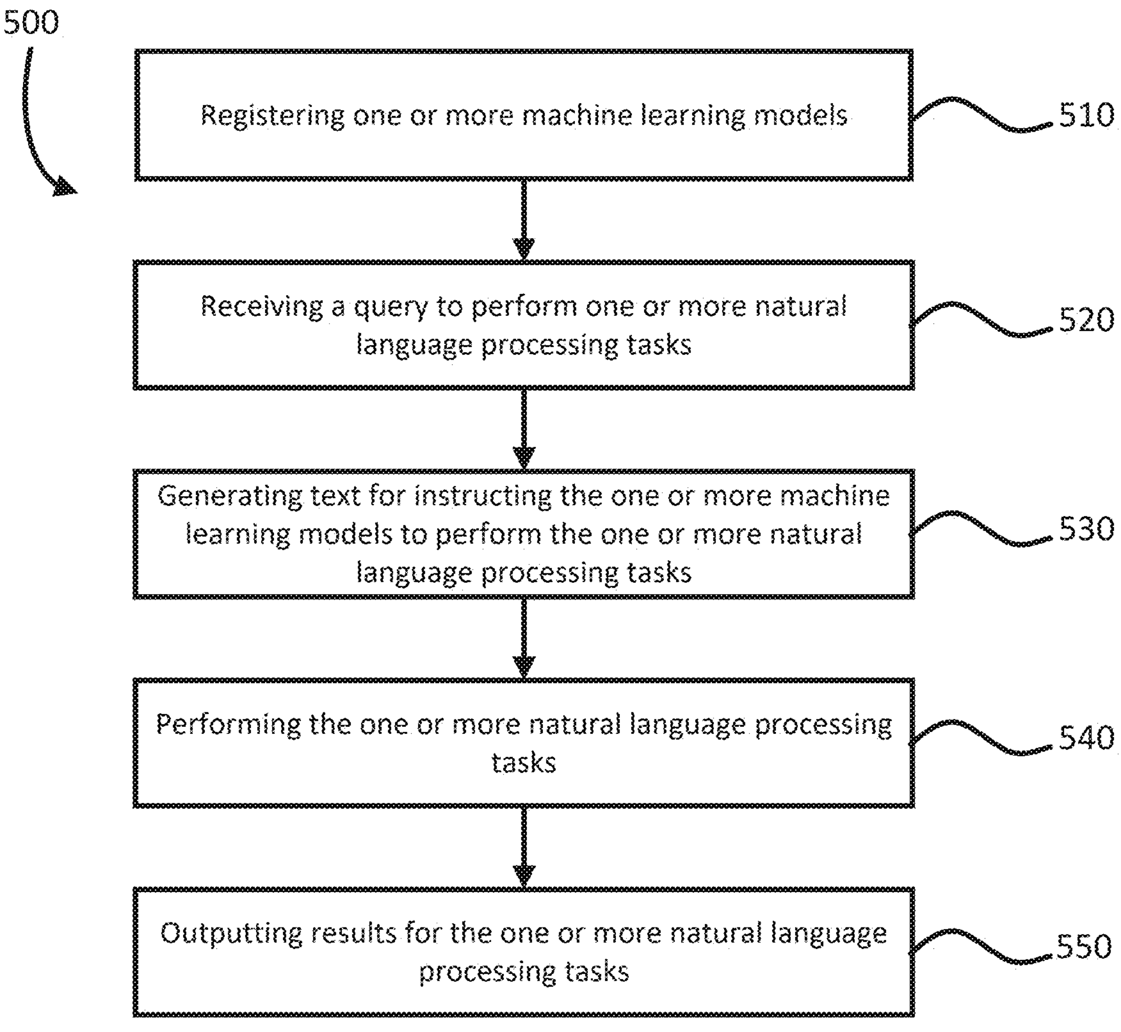
FIG. 5 depicts a flow diagram of an example process for performing a natural language processing task in a cloud database platform according to aspects of the disclosure.

FIG. 5 depicts a flow diagram of an example process 500 for performing a natural language processing task in a cloud database platform, such as a data warehouse. Example natural language processing tasks can include sentiment analysis, named entity recognition, text translation, text summarization, and/or text classification. The example process 500 can be performed on a system of one or more processors in one or more locations, such as the model inference system 100 as depicted in FIG. 1.

As shown in block 510, the model inference system 100 can register one or more machine learning models for performing one or more natural language processing tasks. The machine learning models can be large language models, as an example. The machine learning models can be parallelized virtual models integrated in the cloud database platform. Registering the one or more machine learning models can associate the machine learning models with a user of the cloud database platform. For example, the model inference system 100 can generate the one or more machine learning models and/or train the one or more machine learning models.

As shown in block 520, the model inference system 100 can receive a query to perform the one or more natural language processing tasks. The query can include a table valued function configured to generate text for instructing the one or more machine learning models to perform the one or more natural language processing tasks using tabular data stored in the cloud database platform. The table valued function can include one or more references to one or more datasets of the tabular data, one or more references to the one or more machine learning models, and/or one or more parameters. The parameters can include temperature, maximum output tokens, top-k, and/or top-p, as examples. The parameters can provide a degree of randomness and/or a length of results for performance of the machine learning models. The table valued function can further include a prompt prefix corresponding to the one or more natural language processing tasks as well as text content on which to perform the natural language processing tasks.

As shown in block 530, the model inference system 100 can generate text for instructing the one or more machine learning models to perform the one or more natural language processing tasks based on the table valued function. The table valued function can be received via API calls together with the query. The model inference system 100 can determine which datasets of the tabular data to use, which models to use, and/or which parameters to use based on the respective references in the table valued function. The model inference system 100 can further determine which natural language processing tasks to perform and on which text content based on the prompt prefix and text content in the table valued function.

As shown in block 540, the model inference system 100 can perform the one or more natural language processing tasks using the generated text and based on the tabular data of the cloud database platform. The model inference system 100 can use the one or more machine learning models to perform the natural language processing tasks.

As shown in block 550, the model inference system 100 can output results for the one or more natural language processing tasks. For example, the results can be aggregated tabular data displayed as a table. Results for each row of a table can be displayed based on the tabular data used in performing the one or more natural language processing tasks.

Aspects of this disclosure can be implemented in digital electronic circuitry, in tangibly embodied computer software or firmware, and/or in computer hardware, such as the structure disclosed herein, their structural equivalents, or combinations thereof. Aspects of this disclosure can further be implemented as one or more computer programs, such as one or more modules of computer program instructions encoded on a tangible non-transitory computer storage medium for execution by, or to control the operation of, one or more data processing apparatus. The computer storage medium can be a machine-readable storage device, a machine-readable storage substrate, a random or serial access memory device, or combinations thereof. The computer program instructions can be encoded on an artificially generated propagated signal, such as a machine-generated electrical, optical, or electromagnetic signal, that is generated to encode information for transmission to suitable receiver apparatus for execution by a data processing apparatus.

The term "configured" is used herein in connection with systems and computer program components. For a system of one or more computers to be configured to perform particular operations or actions means that the system has installed thereon software, firmware, hardware, or a combination thereof that cause the system to perform the operations or actions. For one or more computer programs to be configured to perform particular operations or actions means that the one or more programs include instructions that, when executed by one or more data processing apparatus, cause the apparatus to perform the operations or actions.

The term "data processing apparatus" or "data processing system" refers to data processing hardware and encompasses various apparatus, devices, and machines for processing data, including programmable processors, computers, or combinations thereof. The data processing apparatus can include special purpose logic circuitry, such as a field programmable gate array (FPGA) or an application specific integrated circuit (ASIC). The data processing apparatus can include code that creates an execution environment for computer programs, such as code that constitutes processor firmware, a protocol stack, a database management system, an operating system, or combinations thereof.

The term "computer program" refers to a program, software, a software application, an app, a module, a software module, a script, or code. The computer program can be written in any form of programming language, including compiled, interpreted, declarative, or procedural languages, or combinations thereof. The computer program can be deployed in any form, including as a standalone program or as a module, component, subroutine, or other unit suitable for use in a computing environment. The computer program can correspond to a file in a file system and can be stored in a portion of a file that holds other programs or data, such as one or more scripts stored in a markup language document, in a single file dedicated to the program in question, or in multiple coordinated files, such as files that store one or more modules, sub programs, or portions of code. The computer program can be executed on one computer or on multiple computers that are located at one site or distributed across multiple sites and interconnected by a data communication network.

The term "database" refers to any collection of data. The data can be unstructured or structured in any manner. The data can be stored on one or more storage devices in one or more locations. For example, an index database can include multiple collections of data, each of which may be organized and accessed differently.

The term "engine" refers to a software-based system, subsystem, or process that is programmed to perform one or more specific functions. The engine can be implemented as one or more software modules or components or can be installed on one or more computers in one or more locations. A particular engine can have one or more computers dedicated thereto, or multiple engines can be installed and running on the same computer or computers.

The processes and logic flows described herein can be performed by one or more computers executing one or more computer programs to perform functions by operating on input data and generating output data. The processes and logic flows can also be performed by special purpose logic circuitry, or by a combination of special purpose logic circuitry and one or more computers.

A computer or special purpose logic circuitry executing the one or more computer programs can include a central processing unit, including general or special purpose microprocessors, for performing or executing instructions and one or more memory devices for storing the instructions and data. The central processing unit can receive instructions and data from the one or more memory devices, such as read only memory, random access memory, or combinations thereof, and can perform or execute the instructions. The computer or special purpose logic circuitry can also include, or be operatively coupled to, one or more storage devices for storing data, such as magnetic, magneto optical disks, or optical disks, for receiving data from or transferring data to. The computer or special purpose logic circuitry can be embedded in another device, such as a mobile phone, a personal digital assistant (PDA), a mobile audio or video player, a game console, a Global Positioning System (GPS), or a portable storage device, e.g., a universal serial bus (USB) flash drive, as examples.

Computer readable media suitable for storing the one or more computer programs can include any form of volatile or non-volatile memory, media, or memory devices. Examples include semiconductor memory devices, e.g., EPROM, EEPROM, or flash memory devices, magnetic disks, e.g., internal hard disks or removable disks, magneto optical disks, CD-ROM disks, DVD-ROM disks, or combinations thereof.

Aspects of the disclosure can be implemented in a computing system that includes a back end component, e.g., as a data server, a middleware component, e.g., an application server, or a front end component, e.g., a client computer having a graphical user interface, a web browser, or an app, or any combination thereof. The components of the system can be interconnected by any form or medium of digital data communication, such as a communication network. Examples of communication networks include a local area network (LAN) and a wide area network (WAN), e.g., the Internet.

The computing system can include clients and servers. A client and server can be remote from each other and interact through a communication network. The relationship of client and server arises by virtue of the computer programs running on the respective computers and having a client-server relationship to each other. For example, a server can transmit data, e.g., an HTML page, to a client device, e.g., for purposes of displaying data to and receiving user input from a user interacting with the client device. Data generated at the client device, e.g., a result of the user interaction, can be received at the server from the client device.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for performing a natural language processing task in a cloud database platform, the method comprising:

receiving, by one or more processors, a query to perform the natural language processing task, the query comprising a table valued function configured to generate text in a tabular format for instructing a machine learning model to perform the natural language processing task based on tabular data stored in the cloud database platform, the table valued function comprising a prompt prefix corresponding to the natural language processing task and one or more references to one or more datasets of the tabular data;

generating, by the one or more processors, the text in the tabular format for instructing the machine learning model to perform the natural language processing task using the table valued function by:

determining which natural language processing task to perform based on the prompt prefix;

determining which datasets of the tabular data to use for the natural language processing task based on the one or more references; and generating a first column of the text for the natural language processing task and a second column of the text for the datasets to use for the natural language processing task;

performing, by the one or more processors, the natural language processing task using the text and the tabular data stored in the cloud database platform; and outputting, by the one or more processors, tabular results for the natural language processing task as a response to the query.

2. The method of claim 1, further comprising registering, by the one or more processors, the machine learning model with a user of the cloud database platform.

3. The method of claim 2, wherein registering the machine learning model further comprises generating the machine learning model.

4. The method of claim 1, wherein the machine learning model is a large language model.

5. The method of claim 1, wherein the natural language processing task comprises at least one of sentiment analysis, named entity recognition, text translation, text summarization, or text classification.

6. The method of claim 1, wherein:

the table valued function comprises one or more references to the machine learning model; and generating the text for instructing the machine learning model to perform the natural language processing task further comprises:

determining which machine learning model to use for performing the natural language processing task based on the references to the machine learning model; and generating a third column of the text for the machine learning model to use for the natural language processing task.

7. The method of claim 1, wherein:

the table valued function comprises one or more parameters affecting performance of the machine learning model; and generating the text for instructing the machine learning model to perform the natural language processing task further comprises:

determining which parameters to use based on the parameters in the table valued function; and generating a third column of the text for the parameters to use for the natural language processing task.

8. The method of claim 7, wherein the one or more parameters comprise at least one of temperature, maximum output tokens, top-k, or top-p.

9. A system comprising:

one or more processors; and one or more storage devices coupled to the one or more processors and storing instructions that, when executed by the one or more processors, cause the one or more processors to perform operations for performing a natural language processing task in a cloud database platform, the operations comprising:

receiving a query to perform the natural language processing task, the query comprising a table valued function configured to generate text in a tabular format for instructing a machine learning model to perform the natural language processing task based on tabular data stored in the cloud database platform, the table valued function comprising a prompt prefix corresponding to the natural language processing task and one or more references to one or more datasets of the tabular data;

generating the text in the tabular format for instructing the machine learning model to perform the natural language processing task using the table valued function by:

determining which natural language processing task to perform based on the prompt prefix;

determining which datasets of the tabular data to use for the natural language processing task based on the one or more references; and generating a first column of the text for the natural language processing task and a second column of the text for the datasets to use for the natural language processing task;

performing the natural language processing task using the text and the tabular data stored in the cloud database platform; and outputting tabular results for the natural language processing task as a response to the query.

10. The system of claim 9, wherein the operations further comprise registering the machine learning model with a user of the cloud database platform.

11. The system of claim 10, wherein registering the machine learning model further comprises generating the machine learning model.

12. The system of claim 9, wherein the machine learning model is a large language model.

13. The system of claim 9, wherein the natural language processing task comprises at least one of sentiment analysis, named entity recognition, text translation, text summarization, or text classification.

14. The system of claim 9, wherein:

the table valued function comprises one or more references to the machine learning model; and generating the text for instructing the machine learning model to perform the natural language processing task further comprises:

determining which machine learning model to use for performing the natural language processing task based on the references to the machine learning model in the table valued function; and generating a third column of the text for the machine learning model to use for the natural language processing task.

15. The system of claim 9, wherein:

the table valued function comprises one or more parameters affecting performance of the machine learning model, the one or more parameters comprising at least one of temperature, maximum output tokens, top-k, or top-p; and generating the text for instructing the machine learning model to perform the natural language processing task further comprises:

determining which parameters to use based on the parameters in the table valued function; and generating a third column of the text for the parameters to use for the natural language processing task.

16. A non-transitory computer readable medium for storing instructions that, when executed by one or more processors, cause the one or more processors to perform operations for performing a natural language processing task in a cloud database platform, the operations comprising:

receiving a query to perform the natural language processing task, the query comprising a table valued function configured to generate text in a tabular format for instructing a machine learning model to perform the natural language processing task based on tabular data stored in the cloud database platform, the table valued function comprising a prompt prefix corresponding to the natural language processing task and one or more references to one or more datasets of the tabular data;

generating the text in the tabular format for instructing the machine learning model to perform the natural language processing task using the table valued function by:

determining which natural language processing task to perform based on the prompt prefix;

determining which datasets of the tabular data to use for the natural language processing task based on the one or more references; and generating a first column of the text for the natural language processing task and a second column of the text for the dataset to use for the natural language processing task;

performing the natural language processing task using the text and the tabular data stored in the cloud database platform; and outputting tabular results for the natural language processing task as a response to the query.

* * * * *